(12) United States Patent
Imamura et al.

(10) Patent No.: US 7,242,794 B2
(45) Date of Patent: Jul. 10, 2007

(54) METHOD AND APPARATUS FOR DETECTING ABNORMAL PATTERN CANDIDATES

(75) Inventors: Takashi Imamura, Kaisei-machi (JP); Hideya Takeo, Kaisei-machi (JP)

(73) Assignee: Fujifilm Corporation, Tokyo (JP)

( * ) Notice: Subject to any disclaimer, the term of this patent is extended or adjusted under 35 U.S.C. 154(b) by 780 days.

(21) Appl. No.: 09/961,208

(22) Filed: Sep. 24, 2001

(65) Prior Publication Data

US 2002/0057826 A1 May 16, 2002

(30) Foreign Application Priority Data

Sep. 22, 2000 (JP) ............................ 2000/289286

(51) Int. Cl.
*G06K 9/00* (2006.01)
(52) U.S. Cl. .................... 382/128; 382/130; 382/132
(58) Field of Classification Search ........ 382/128–132; 364/413.13
See application file for complete search history.

(56) References Cited

U.S. PATENT DOCUMENTS

| 4,907,156 A | * | 3/1990 | Doi et al. ................. 382/130 |
| 5,319,549 A | * | 6/1994 | Katsuragawa et al. ...... 382/108 |
| 5,561,724 A | * | 10/1996 | Kido et al. ................ 382/264 |
| 5,583,346 A | * | 12/1996 | Nakajima ................. 250/587 |
| 5,598,481 A | * | 1/1997 | Nishikawa et al. ......... 382/130 |
| 5,714,764 A | * | 2/1998 | Takeo et al. ............... 250/587 |
| 5,761,334 A | | 6/1998 | Nakajima ................. 382/132 |
| 6,014,474 A | | 1/2000 | Takeo et al. .............. 382/308 |

FOREIGN PATENT DOCUMENTS

| JP | 8-263648 | 10/1996 |
| JP | 8-294479 | 11/1996 |
| JP | 9-106448 | 4/1997 |
| JP | 8-272961 | 10/1997 |

OTHER PUBLICATIONS

"Medical Imaging Technology", vol. 12, No. 1, 1994.
"Transactions of the Institute of Electronics, Information, and Communication Engineers of Japan", D-II, vol. J75-D-II, No. 7, pp. 1170-1176, 1992.

* cited by examiner

*Primary Examiner*—Matthew C. Bella
*Assistant Examiner*—Patrick Edwards
(74) *Attorney, Agent, or Firm*—Sughrue Mion, PLLC

(57) ABSTRACT

Processing, in which a first shape-dependent filter in accordance with a shape of a microcalcification pattern is utilized, is performed on an object image, and a fine structure image, which illustrates a fine structure area embedded in the object image, is formed. Thereafter, enhancement processing, in which a second shape-dependent filter in accordance with the shape of a microcalcification pattern is utilized, is performed on the fine structure image, and an enhancement-processed image, in which the microcalcification pattern has been enhanced, is formed. A microcalcification pattern candidate is then detected by use of the enhancement-processed image.

24 Claims, 6 Drawing Sheets

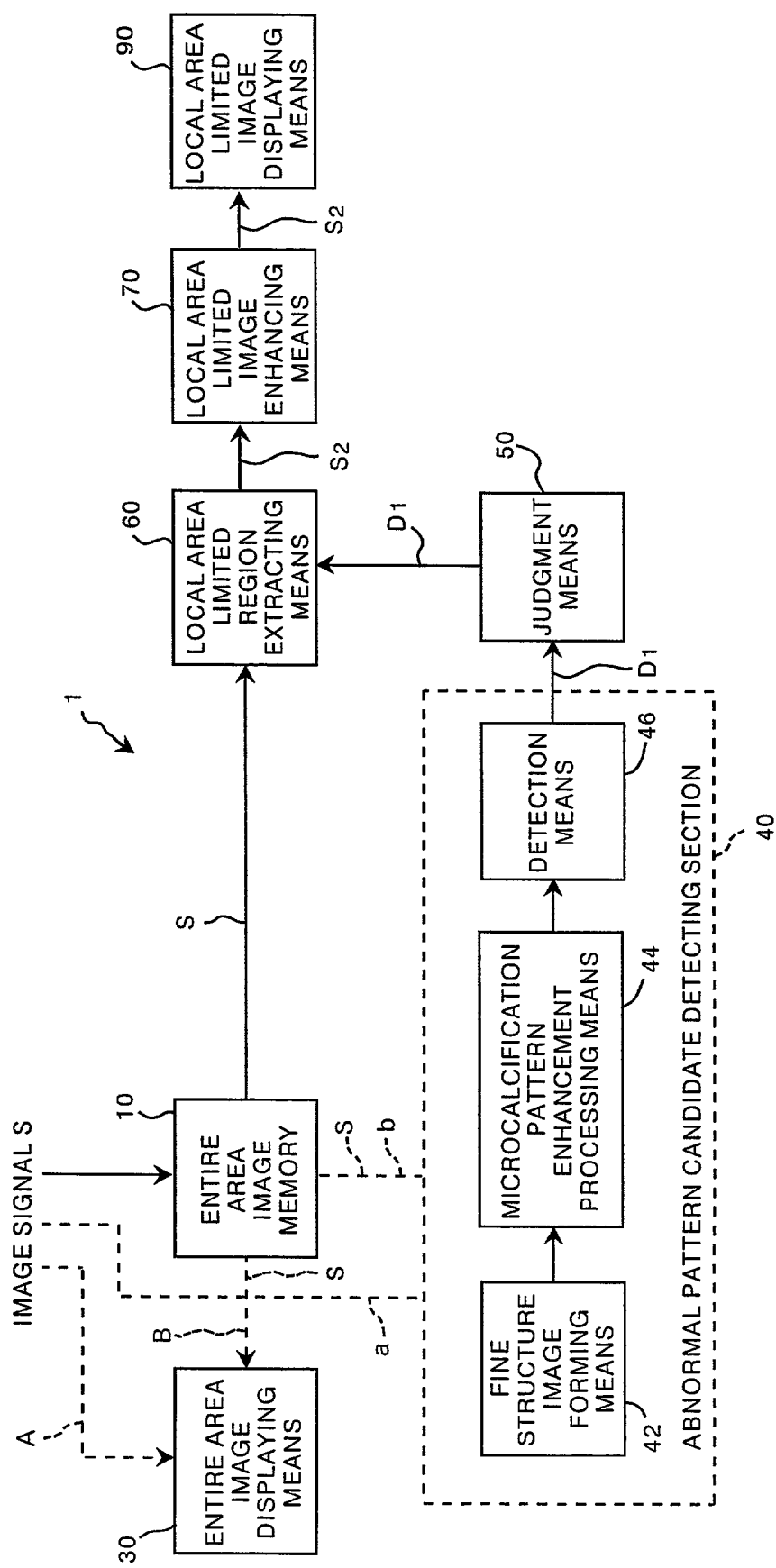

LINE I-I

F I G. 6A
ORIGINAL IMAGE
F I G. 6B
FINE STRUCTURE IMAGE
OBTAINED FROM MORPHOLOGICAL
FILTER PROCESSING
F I G. 6C
ENHANCEMENT-PROCESSED IMAGE
OBTAINED FROM MATCHED
FILTER PROCESSING

METHOD AND APPARATUS FOR DETECTING ABNORMAL PATTERN CANDIDATES

BACKGROUND OF THE INVENTION

1. Field of the Invention

This invention relates to a method and apparatus for detecting a candidate area for a microcalcification pattern embedded in an object image.

2. Description of the Related Art

Image processing, such as gradation processing or processing in a frequency domain, has heretofore been performed on an image signal, which represents an image and has been obtained with one of various image acquiring techniques, such that a visible image having good image quality can be reproduced and used as an effective tool in, particularly, the accurate and efficient diagnosis of an illness. Particularly, in the field of medical images, such as radiation images of human bodies serving as objects, it is necessary for specialists, such as doctors, to make an accurate diagnosis of an illness or an injury of the patient in accordance with the obtained image. Therefore, it is essential to perform the image processing in order that a visible image having good image quality can be reproduced and used as an effective tool in the accurate and efficient diagnosis of an illness.

In such image processing, the processing is often performed on the entire area of the image. Alternatively, in cases where the purpose of examination or diagnosis is clear to a certain extent, enhancement processing is often performed selectively on a desired image area, which is adapted to the purpose of examination or diagnosis.

Ordinarily, when an image area to be processed is to be selected, the person, who views the radiation image, views the original image before being processed and manually selects the image area to be processed. However, there is the risk that the selected image area or the specified image range will vary, depending upon the level of the experience or the image understanding capability of the person, who views the radiation image, and the selection cannot be made objectively.

For example, in cases where a radiation image has been recorded for the examination of breast cancer, it is necessary to find a microcalcification pattern, which is one of features of a cancerous area, from the radiation image. However, the range of the microcalcification pattern cannot always be specified accurately. Therefore, there is a strong demand for techniques for accurately detecting an abnormal pattern, such as a microcalcification pattern, without depending upon the skill of the person, who views the radiation image.

In order to satisfy the demand described above, extensive research has been conducted to make a computer aided diagnosis of medical images (CADM), such that a calcification pattern candidate is capable of being detected automatically by use of processing with computers. As one of the CADM techniques, morphological filter processing has been proposed. [The morphological filter processing is proposed in, for example, "Extraction of Microcalcifications Using Morphological Filter with Multiple Structuring Elements," Kobatake, et al., Transactions of The Institute of Electronics, Information, and Communication Engineers of Japan, D-II, Vol. J75-D-II, No. 7, pp. 1170–1176, July 1992 (hereinbelow referred to as Literature 1); and "Fundamentals of Morphology and Its Application to Mammogram Processing," Medical Imaging Technology, Vol. 12, No. 1, January 1994 (hereinbelow referred to as Literature 2).]

The applicant proposed various abnormal pattern candidate detecting processing systems (computer aided medical image diagnosing apparatuses), wherein abnormal pattern candidate detecting processing is performed for automatically detecting a calcification pattern, which is one of forms of abnormal patterns and is embedded in a mammogram (a mamma image for diagnosis), a chest image, or the like, by use of a morphological filter, and an image obtained by superposing an image, which has been obtained by performing enhancement processing, image size enlargement processing, or the like, on a region of an abnormal pattern candidate having been detected, upon a certain area of an entire area image, such that the image has good image quality and can serve as an effective tool in the efficient and accurate diagnosis, an index value in the abnormal pattern candidate detecting processing, or the degree of certainty of detection is outputted. The proposed abnormal pattern candidate detecting processing systems are disclosed in, for example, Japanese Unexamined Patent Publication Nos. 8(1996)-263648, 8(1996)-272961, 8(1996)-294479, and 9(1997)-106448.

With the abnormal pattern candidate detecting processing in which the morphological filter is utilized, an image area, in which the image density fluctuates within a range spatially narrower than a multi-structure element (i.e., a mask) having a size in accordance with the size of an abnormal pattern to be detected, is detected as an abnormal pattern candidate by use of the multi-structure element. (The abnormal pattern candidate detecting processing in which the morphological filter is utilized will hereinbelow be referred to as the morphological filter processing.) With the morphological filter processing, a candidate for a microcalcification pattern, which is one of characteristic forms of breast cancers, is capable of being detected automatically. (The microcalcification pattern is one of forms of abnormal patterns.) The morphological filter processing has the features in that, for example, (1) it is efficient for extracting a calcification pattern itself, (2) it is not affected by complicated background information, and (3) the extracted calcification pattern does not become distorted. Specifically, for example, in cases where the morphological filter processing is utilized for a mammogram, a linear structure, or the like, is capable of being kept unremoved from the mamma image, and only fine structures, such as microcalcifications and noise, are capable of being removed from the mamma image. Thus the morphological filter processing is advantageous over differentiation processing, which is an ordinary technique for enhancing a specific structure element, in that the detection of the calcification pattern is capable of being performed such that the geometrical information concerning the size, the shape, and the image density distribution of the calcification pattern is kept more accurately.

The morphological filter processing is an image processing technique appropriate for extraction and recognition of a feature concerning the shape in an image. As described above, the morphological filter processing has been studied particularly as a technique efficient for detecting the microcalcification pattern, which is one of characteristic forms of breast cancers. However, the image to be processed with the morphological filter processing is not limited to the microcalcification pattern in the mammogram, and the morphological filter processing is applicable to any kind of image, in which the size and the shape of a specific image area (i.e., an abnormal pattern, or the like) to be detected are known previously.

However, in cases where the microcalcification pattern candidate is to be detected with the morphological filter processing, the problems occur in that, theoretically, a linear component and a structure not longer than the structure element length, which have a direction that does not coincide with any of the directions of the structure elements constituting the multi-structure element, cannot be removed. (Both the linear component and the structure not longer than the structure element length, which are described above, will hereinbelow be referred to as the linear structure area.) The problems described above cause erroneous detection to occur during the detection of the microcalcification pattern. Also, a microcalcification pattern, which is unsharp or is constituted over a plurality of pixels, and a non-calcification pattern, which has a size identical with the size of the calcification pattern, cannot always be removed with the morphological filter processing. (Both the microcalcification pattern, which is unsharp or is constituted over a plurality of pixels, and the non-calcification pattern, which has a size identical with the size of the calcification pattern, will hereinbelow be referred to as the coarse structure area.)

Therefore, in cases where image enhancement processing is performed on the image, which has been obtained from the morphological filter processing, the problems occur in that, besides the calcification pattern, the fine structures of the linear structure area and the coarse structure area, which could not be removed with the morphological filter processing, are also enhanced and appear as noise. As a result, an image, which is hard to see, is obtained.

In order for the problems described above to be solved, techniques have been proposed, wherein the image, which has been obtained from the morphological filter processing, is subtracted from the original image, a fine structure image, which illustrates a fine structure area in the image, is thereby formed, threshold value processing is performed on the fine structure image, and a microcalcification pattern is thereby detected. The proposed techniques are disclosed in, for example, Literature 1 described above, Literature 2 described above, and Japanese Unexamined Patent Publication No. 9(1997)-106448. However, the proposed techniques are not perfectly satisfactory.

SUMMARY OF THE INVENTION

The primary object of the present invention is to provide a method of detecting an abnormal pattern candidate, wherein in adverse effects of a linear structure area and a coarse structure area are eliminated.

Another object of the present invention is to provide an apparatus for carrying out the method of detecting an abnormal pattern candidate.

The present invention provides a method of detecting an abnormal pattern candidate, in which a microcalcification pattern candidate embedded in an object image is detected as an abnormal pattern candidate and in accordance with image information representing the object image, the method comprising the steps of:

i) performing processing, in which a first shape-dependent filter in accordance with a shape of a microcalcification pattern is utilized, on the object image, a fine structure image, which illustrates a fine structure area embedded in the object image, being thereby formed, ii) performing enhancement processing, in which a second shape-dependent filter in accordance with the shape of the microcalcification pattern (and having characteristics different from the characteristics of the first shape-dependent filter) is utilized, on the fine structure image, an enhancement-processed image, in which the microcalcification pattern has been enhanced, being thereby formed, and iii) detecting the microcalcification pattern candidate by use of the enhancement-processed image.

Each of the term "first shape-dependent filter in accordance with a shape of a microcalcification pattern" and the term "second shape-dependent filter in accordance with a shape of a microcalcification pattern" as used herein means the filter in accordance with the geometrical information concerning the size, the shape, or the image density distribution of the calcification pattern. The first shape-dependent filter and the second shape-dependent filter may be selected from various kinds of filters.

In the method of detecting an abnormal pattern candidate in accordance with the present invention, the first shape-dependent filter should preferably be a morphological filter.

Also, the second shape-dependent filter should preferably be a filter in accordance with the size and an image density gradient (or a luminance gradient) of the microcalcification pattern to be detected.

In cases where the signal processing is performed with respect to the image density, the term "enhancement processing" as used herein means the processing performed such that the image density of the microcalcification pattern area in the enhancement-processed image, which is obtained from the processing, is enhanced to a level higher than the levels of image densities of the other areas. Also, in cases where the signal processing is performed with respect to the luminance, the term "enhancement processing" as used herein means the processing performed such that the luminance of the microcalcification pattern area in the enhancement-processed image, which is obtained from the processing, is enhanced to a level higher than the levels of luminances of the other areas. Therefore, the processing may be performed on the microcalcification pattern area alone, the other areas alone, or both the microcalcification pattern area and the other areas, such that the difference in image density or luminance between the microcalcification pattern area and the other areas becomes large. For example, the image density of the microcalcification pattern area alone may be set to be high, or the image densities of the areas other than the microcalcification pattern area may be set to be low. In this manner, the enhancement-processed image, in which only the microcalcification pattern has been enhanced specifically, is capable of being obtained.

It is considered that the shape of the microcalcification pattern embedded in the object image changes finely in accordance with an image recording apparatus, an image read-out apparatus, and setting conditions of the image recording apparatus and the image read-out apparatus. Therefore, the shape-dependent filter, particularly the second shape-dependent filter, should preferably be optimized under the respective conditions. However, if the optimized filter is determined and set at the time of each detection processing, the overall throughput speed will become low. Therefore, a plurality of second shape-dependent filters, which have been optimized in accordance with various assumed conditions and various assumed image characteristics, should preferably be prepared previously and changed over in accordance with the object image to be subjected to the processing.

Specifically, the method of detecting an abnormal pattern candidate in accordance with the present invention should preferably be modified such that a plurality of second shape-dependent filters, which conform to different image recording conditions at the time of object image acquisition, are prepared for the respective image recording conditions, a second shape-dependent filter, which conforms to the image recording conditions of the object image to be processed, is selected from the plurality of the second shape-dependent filters having been prepared, and the enhancement processing is performed by use of the thus selected second shape-dependent filter.

Alternatively, the method of detecting an abnormal pattern candidate in accordance with the present invention should preferably be modified such that a plurality of second shape-dependent filters, which conform to different read-out conditions at the time of object image acquisition, are prepared for the respective read-out conditions, a second shape-dependent filter, which conforms to the read-out conditions of the object image to be processed, is selected from the plurality of the second shape-dependent filters having been prepared, and the enhancement processing is performed by use of the thus selected second shape-dependent filter.

Besides the image recording conditions and the read-out conditions, the contrast and the size of the microcalcification pattern vary for different microcalcification patterns. Therefore, a second shape-dependent filter, which enables the enhancement processing to be performed with respect to a specific type of microcalcification pattern, such as an unsharp microcalcification pattern, should preferably be designed and utilized.

Specifically, the method of detecting an abnormal pattern candidate in accordance with the present invention should preferably be modified such that a plurality of second shape-dependent filters, which conform to different contrasts of microcalcification patterns embedded in object images, are prepared for the respective contrasts, a second shape-dependent filter, which conforms to the contrast of the microcalcification pattern embedded in the object image to be processed, is selected from the plurality of the second shape-dependent filters having been prepared, and the enhancement processing is performed by use of the thus selected second shape-dependent filter.

Alternatively, the method of detecting an abnormal pattern candidate in accordance with the present invention should preferably be modified such that a plurality of second shape-dependent filters, which conform to different sizes of microcalcification patterns embedded in object images, are prepared for the respective sizes, a second shape-dependent filter, which conforms to the size of the microcalcification pattern embedded in the object image to be processed, is selected from the plurality of the second shape-dependent filters having been prepared, and the enhancement processing is performed by use of the thus selected second shape-dependent filter.

Ordinarily, the image recording conditions and the read-out conditions are not set independently and are set in combination with each other. Also, ordinarily, the shape and the contrast of the microcalcification pattern embedded in the object image change in a complicated manner in accordance with a combination of the image recording conditions and the read-out conditions. Therefore, in certain cases, in lieu of the plurality of the second shape-dependent filters being prepared for the image recording conditions, the read-out conditions, the size of the microcalcification pattern, or the contrast of the microcalcification pattern alone, the plurality of the second shape-dependent filters should preferably be prepared in accordance with the combination of the image recording conditions, the read-out conditions, and the size and the contrast of the microcalcification pattern.

Specifically, the method of detecting an abnormal pattern candidate in accordance with the present invention should preferably be modified such that a plurality of second shape-dependent filters, which conform to different combinations of image recording conditions at the time of object image acquisition, read-out conditions at the time of object image acquisition, contrasts of microcalcification patterns embedded in object images, and sizes of microcalcification patterns embedded in object images, are prepared for the respective combinations, a second shape-dependent filter, which conforms to the combination with respect to the object image to be processed, is selected from the plurality of the second shape-dependent filters having been prepared, and the enhancement processing is performed by use of the thus selected second shape-dependent filter.

The present invention also provides an apparatus for detecting an abnormal pattern candidate, in which a microcalcification pattern candidate embedded in an object image is detected as an abnormal pattern candidate and in accordance with image information representing the object image, the apparatus comprising:

i) fine structure image forming means for performing processing, in which a first shape-dependent filter in accordance with a shape of a microcalcification pattern is utilized, on the object image, in order to form a fine structure image, which illustrates a fine structure area embedded in the object image, ii) enhancement-processed image forming means for performing enhancement processing, in which a second shape-dependent filter in accordance with the shape of the microcalcification pattern is utilized, on the fine structure image having been formed, in order to form an enhancement-processed image, in which the microcalcification pattern has been enhanced, and iii) detection means for detecting the microcalcification pattern candidate by use of the enhancement-processed image having been formed.

In the apparatus for detecting an abnormal pattern candidate in accordance with the present invention, the enhancement-processed image forming means should preferably operate such that:

a plurality of second shape-dependent filters, which conform to different image recording conditions at the time of object image acquisition, are prepared for the respective image recording conditions, a second shape-dependent filter, which conforms to the image recording conditions of the object image to be processed, is selected from the plurality of the second shape-dependent filters having been prepared, and the enhancement processing is performed by use of the thus selected second shape-dependent filter.

Also, in the apparatus for detecting an abnormal pattern candidate in accordance with the present invention, the enhancement-processed image forming means should preferably operate such that:

a plurality of second shape-dependent filters, which conform to different read-out conditions at the time of object image acquisition, are prepared for the respective read-out conditions, a second shape-dependent filter, which conforms to the read-out conditions of the object image to be processed, is selected from the plurality of the second shape-dependent filters having been prepared, and the enhancement processing is performed by use of the thus selected second shape-dependent filter.

Further, in the apparatus for detecting an abnormal pattern candidate in accordance with the present invention, the enhancement-processed image forming means should preferably operate such that:

a plurality of second shape-dependent filters, which conform to different contrasts of microcalcification patterns embedded in object images, are prepared for the respective contrasts, a second shape-dependent filter, which conforms to the contrast of the microcalcification pattern embedded in the object image to be processed, is selected from the plurality of the second shape-dependent filters having been prepared, and the enhancement processing is performed by use of the thus selected second shape-dependent filter.

Furthermore, in the apparatus for detecting an abnormal pattern candidate in accordance with the present invention, the enhancement-processed image forming means should preferably operate such that:

a plurality of second shape-dependent filters, which conform to different sizes of microcalcification patterns embedded in object images, are prepared for the respective sizes, a second shape-dependent filter, which conforms to the size of the microcalcification pattern embedded in the object image to be processed, is selected from the plurality of the second shape-dependent filters having been prepared, and the enhancement processing is performed by use of the thus selected second shape-dependent filter.

Also, in the apparatus for detecting an abnormal pattern candidate in accordance with the present invention, the enhancement-processed image forming means should preferably operate such that:

a plurality of second shape-dependent filters, which conform to different combinations of image recording conditions at the time of object image acquisition, read-out conditions at the time of object image acquisition, contrasts of microcalcification patterns embedded in object images, and sizes of microcalcification patterns embedded in object images, are prepared for the respective combinations, a second shape-dependent filter, which conforms to the combination with respect to the object image to be processed is selected from the plurality of the second shape-dependent filters having been prepared, and the enhancement processing is performed by use of the thus selected second shape-dependent filter.

Further, the apparatus for detecting an abnormal pattern candidate in accordance with the present invention should preferably be modified such that the fine structure image forming means utilizes a morphological filter as the first shape-dependent filter.

With the method and apparatus for detecting an abnormal pattern candidate in accordance with the present invention, the fine structure image is formed by use of the first shape-dependent filter in accordance with the shape of the microcalcification pattern. Also, the enhancement processing with the second shape-dependent filter is performed on the fine structure image, and the enhancement-processed image is thereby formed. Therefore, the advantages over the cases wherein the first shape-dependent filter, such as the morphological filter, alone is utilized are capable of being obtained in that, in the thus formed enhancement-processed image, only the microcalcification pattern is capable of being enhanced specifically without being adversely affected by a coarse structure area and a linear structure area.

In this manner, noise components, such as the coarse structure area and the fine linear structure area, are capable of being suppressed relatively. As a result, the performance (the detection accuracy) of the microcalcification pattern candidate detecting processing is capable of being enhanced.

With the method and apparatus for detecting an abnormal pattern candidate in accordance with the present invention, the plurality of the second shape-dependent filters, which conform to different image recording conditions, and the like, may be prepared for the respective image recording conditions, and the like. Also, a second shape-dependent filter, which conforms to the image recording conditions, and the like, of the object image to be processed, may be selected from the plurality of the second shape-dependent filters having been prepared. In such cases, the microcalcification pattern candidate detecting processing, which markedly conforms to the object image to be processed, is capable of being performed without the overall throughput speed becoming low.

BRIEF DESCRIPTION OF THE DRAWINGS

FIG. 1 is a block diagram showing an example of a computer aided medical image diagnosing system, in which an embodiment of the apparatus for detecting an abnormal pattern candidate in accordance with the present invention is employed, FIG. 6A is a diagram showing a profile of a signal representing an original image, FIG. 6B is a diagram showing a profile of a signal representing a fine structure image, which has been obtained from morphological filter processing, and FIG. 6C is a diagram showing a profile of a signal representing an enhancement-processed image, which has been obtained from matched filter processing.

DESCRIPTION OF THE PREFERRED EMBODIMENTS

The present invention will hereinbelow be described in further detail with reference to the accompanying drawings.

FIG. 1 is a block diagram showing an example of a computer aided medical image diagnosing system, in which an embodiment of the apparatus for detecting an abnormal pattern candidate in accordance with the present invention is employed.

Figure 2A:
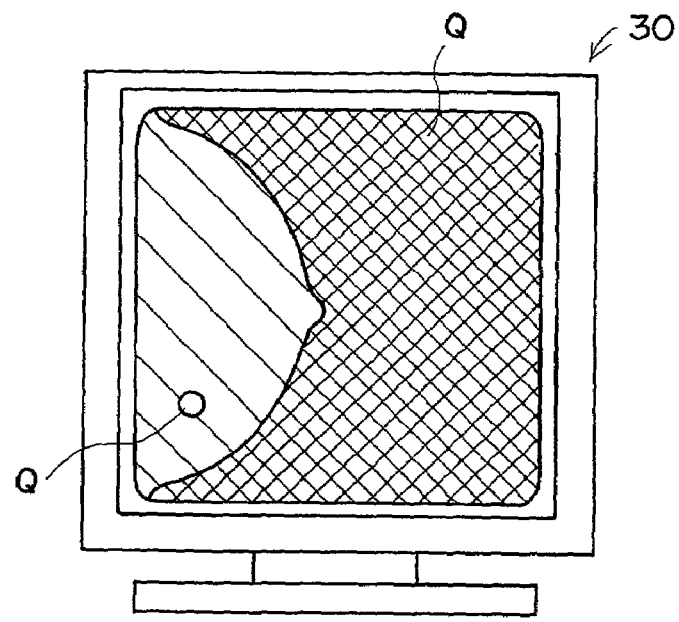
FIG. 2A is a schematic view showing an entire area image Q of a radiation image, which is displayed on entire area image displaying means.
Figure 2B:
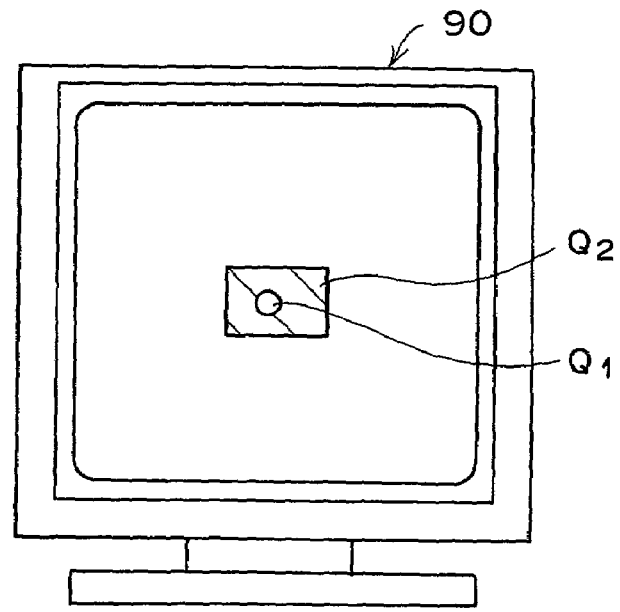
FIG. 2B is a schematic view showing a local area limited image $Q_2$ containing an abnormal pattern candidate $Q_1$, which is displayed on local area limited image displaying means.

FIG. 2A is a schematic view showing an entire area image Q of a radiation image, which is displayed on entire area image displaying means. FIG. 2B is a schematic view showing a local area limited image $Q_2$ containing an abnormal pattern candidate $Q_1$, which is displayed on local area limited image displaying means.

A computer aided medical image diagnosing system 1 illustrated in FIG. 1 comprises an entire area image memory 10 for storing an image signal (i.e., an entire area image signal) S, which represents an entire radiation image (i.e., an entire area image) P of the mamma and is made up of a series of image density values Dorg corresponding to pixels. The computer aided medical image diagnosing system 1 also comprises entire area image displaying means 30, which may be constituted of a cathode ray tube (CRT) display device, or the like, and which displays an entire area image Q in accordance with the entire area image signal S having been received directly from the exterior or having been stored in the entire area image memory 10. The computer aided medical image diagnosing system 1 further comprises an abnormal pattern candidate detecting section 40 for detecting an abnormal pattern candidate $Q_1$ in the entire area image Q in accordance with the entire area image signal S, which has been stored in the entire area image memory 10. The abnormal pattern candidate detecting section 40 acts as the apparatus for detecting an abnormal pattern candidate in accordance with the present invention. The computer aided medical image diagnosing system 1 still further comprises judgment means 50 for making a judgment as to whether the abnormal pattern candidate $Q_1$ has been or has not been detected by the abnormal pattern candidate detecting section 40. The computer aided medical image diagnosing system 1 also comprises local area limited region extracting means 60. In cases where it has been judged by the judgment means 50 that the abnormal pattern candidate $Q_1$ has been detected, the local area limited region extracting means 60 extracts an image signal (i.e., a local area limited image signal) $S_2$, which represents a local area limited image $Q_2$ of a local area limited region containing the abnormal pattern candidate $Q_1$, from the entire area image signal S having been stored in the entire area image memory 10. The computer aided medical image diagnosing system 1 further comprises local area limited image enhancing means 70. The local area limited image enhancing means 70 performs image enhancement processing, such as enhancement processing in the frequency domain, gradation processing, or image size enlargement processing, on an abnormal pattern image signal $S_1$, which represents an abnormal pattern candidate and which is among the local area limited image signal $S_2$ having been extracted by the local area limited region extracting means 60, such that the abnormal pattern candidate $Q_1$ in the local area limited image $Q_2$, which is represented by the local area limited image signal $S_2$ having been extracted by the local area limited region extracting means 60, may have better image quality and higher capability of serving as an effective tool in the efficient and accurate diagnosis of an illness than the entire area image Q, which is displayed on the entire area image displaying means 30. The computer aided medical image diagnosing system 1 still further comprises local area limited image displaying means 90, which may be constituted of a CRT display device, or the like, and which displays the local area limited image $Q_2$ in accordance with the local area limited image signal $S_2$ having been obtained from the image enhancement processing performed by the local area limited image enhancing means 70.

The term "local area limited region" as used herein means the region, which contains a calcification pattern candidate acting as the abnormal pattern candidate and areas neighboring with the calcification pattern candidate.

The abnormal pattern candidate detecting section 40 performs the morphological filter processing and detects the candidate for the calcification pattern, which is one form of the abnormal pattern embedded in the object image, as the abnormal pattern candidate. The abnormal pattern candidate detecting section 40 is constituted in the manner described below.

Specifically, the abnormal pattern candidate detecting section 40 comprises fine structure image forming means 42 for performing processing, in which a first shape-dependent filter in accordance with the shape of a microcalcification pattern is utilized, on the object image, which is represented by the entire area image signal S, in order to form a fine structure image, which illustrates a fine structure area embedded in the object image. The abnormal pattern candidate detecting section 40 also comprises microcalcification pattern enhancement processing means 44, which acts as the enhancement-processed image forming means for performing enhancement processing, in which a second shape-dependent filter in accordance with the shape of the microcalcification pattern is utilized, on the fine structure image having been formed, in order to form an enhancement-processed image, in which the microcalcification pattern has been enhanced. The abnormal pattern candidate detecting section 40 further comprises detection means 46 for detecting the microcalcification pattern candidate by use of the enhancement-processed image having been formed.

As the first shape-dependent filter and the second shape-dependent filter, filters having different characteristics are employed. In this embodiment, as the first shape-dependent filter, a morphological filter is employed. Also, as the second shape-dependent filter, a matched filter, which directly represents the shape and an image density gradient of the microcalcification pattern, is employed as will be described later.

As for the matched filter acting as the second shape-dependent filter, a plurality of matched filters, whose filter characteristics have been optimized in accordance with various assumed conditions and image characteristics, such as image recording conditions, read-out conditions, image contrast, and the sizes of microcalcification patterns, are prepared previously for the respective conditions and image characteristics. The thus prepared matched filters are changed over in accordance with the object image to be processed.

The shape and the contrast of the microcalcification pattern embedded in the object image change in a complicated manner in accordance with a combination of the image recording conditions and the read-out conditions. Therefore, besides the plurality of the matched filters, which conform to the image recording conditions, the read-out conditions, the size of the microcalcification pattern, or the contrast of the microcalcification pattern alone, being prepared, or in lieu of such matched filters being prepared, the plurality of the matched filters may be prepared in accordance with the combination of the image recording conditions, the read-out conditions, and the size and the contrast of the microcalcification pattern.

How the computer aided medical image diagnosing system 1, in which the embodiment of the apparatus for detecting an abnormal pattern candidate in accordance with the present invention is employed, operates will be described hereinbelow.

The entire area image signal S, which represents the entire area image Q of the mamma having a calcified part therein and serving as the object, is fed from a magneto-optical disk, an image read-out apparatus, or the like, into the entire area image memory 10. Also, the entire area image signal S is fed directly from the exterior into the entire area image displaying means 30 (along a line A shown in FIG. 1). Alternatively, the entire area image signal S having been stored in the entire area image memory 10 may be fed from the entire area image memory 10 into the entire area image displaying means 30 (along a line B shown in FIG. 1). As illustrated in FIG. 2A, the entire area image displaying means 30 displays the entire area of the radiation image Q (i.e., the entire area image Q) in accordance with the entire area image signal S.

The radiation image Q contains the abnormal pattern candidate (in this case, the microcalcification pattern candidate) $Q_1$ described above. Therefore, the entire area image Q containing the microcalcification pattern candidate $Q_1$ is displayed on the entire area image displaying means 30.

The entire area image signal S having been stored in the entire area image memory 10 is also fed into the fine structure image forming means 42 of the abnormal pattern candidate detecting section 40.

In this embodiment, the image signal (representing the image density values) is the high image density-large digital value type of image signal, in which a large digital image value represents a high image density of the entire area image Q.

The fine structure image forming means 42 performs the morphological filter processing in order to detect the abnormal pattern image signal (in this case, a microcalcification pattern image signal) $S_1$, which represents the abnormal pattern candidate (in this case, a microcalcification pattern candidate) $Q_1$. The morphological filter processing is described in, for example, Japanese Unexamined Patent Publication Nos. 8(1996)-263648, 8(1996)-272961, 8(1996)-294479, and 9(1997)-106448.

Firstly, how the morphological filter processing (morphological operation processing) is applied to the calcification pattern candidate detecting processing will be briefly described hereinbelow. (For details, reference should be made to the Japanese Unexamined Patent Publications listed above.)

In order for a calcification pattern to be detected, it is considered to employ a difference method, in which a smoothed image signal is subtracted from the original image signal. However, with a simple smoothing method, it is difficult to discriminate the calcification pattern from an elongated non-calcification pattern (for example, a pattern of the mammary gland, a blood vessel, mammary gland supporting tissues, or the like). Therefore, Kobatake of Tokyo University of Agriculture and Technology, et al. have proposed a morphological filter, which is represented by Formula (1) shown below and is based upon opening operation using a multi-structure element. (Reference should be made to Literature 1 and Literature 2 described above.)

$$P = f - \max_{i \in (1,\cdots,M)}\{(f \ominus B_i) \oplus B_i\} \quad (1)$$
$$= f - \max_{i \in (1,\cdots,M)}\{f_{Bi}\}$$

Figure 3:
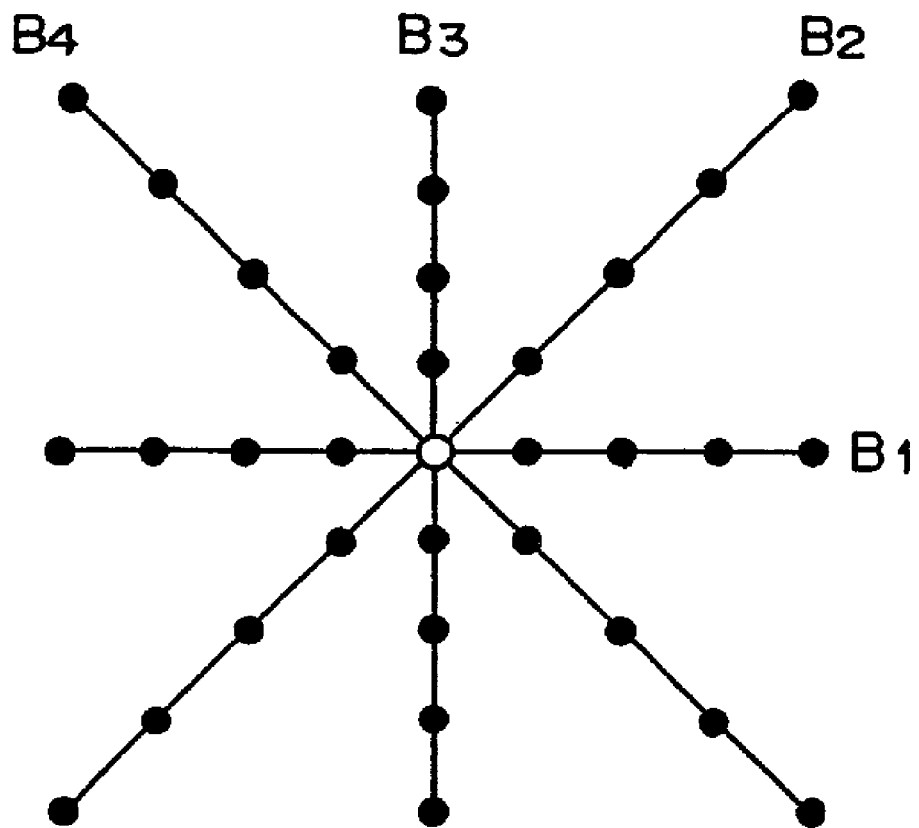
FIG. 3 is an explanatory view showing an example of a multi-structure element employed in morphological filter processing.

In Formula (1), Bi (wherein i=1, 2, ..., M) represents, for example, four linear structure elements Bi (in this case, M=4) shown in FIG. 3. The M number of structure elements, as a whole, will hereinbelow be referred to as the multi-structure element. In cases where the structure element Bi is set to be larger than the calcification pattern to be detected, a calcification pattern, which is a convex signal change area finer than the structure element Bi (i.e., which is an image area fluctuating in a spatially narrow range), is removed in the opening processing. On the other hand, an elongated non-calcification pattern has a length longer than the structure element Bi. Therefore, in cases where the inclination of the non-calcification pattern (i.e, the direction along which the non-calcification pattern extends) coincides with one of the directions of the M number of structure elements Bi, the non-calcification pattern remains unremoved after the opening processing, i.e. the operation of the second term of Formula (1), has been performed. Therefore, when the smoothed image signal obtained from the opening processing (i.e. the signal representing the image, from which only the calcification pattern has been removed) is subtracted from the original image signal f, an image can be obtained which contains only the microcalcification pattern candidate. This is the concept behind Formula (1).

In cases where the image signal is of the high image density-high signal level type, the image density value of the calcification pattern is smaller than the image density values of the surrounding image areas, and the calcification pattern constitutes a concave signal change area with respect to the surrounding areas. Therefore, closing processing is applied in lieu of the opening processing, and Formula (2) shown below is applied in lieu of Formula (1). Specifically, the opening processing, which is performed on the high image density-high signal level type of image signal (i.e., the image signal, in which a large digital value represents a pixel having a high image density), and the closing processing, which is performed on the high luminance-high signal level type of image signal, merely differ from each other in that an image signal represents the image density or the luminance, and are the substantially identical processing.

$$P = f - \min_{i \in (1,\cdots,M)}\{(f \oplus B_i) \ominus B_i\} \quad (2)$$
$$= f - \max_{i \in (1,\cdots,M)}\{f_{Bi}\}$$

Effects of the morphological filter processing and problems encountered with the morphological filter processing will be described hereinbelow with reference to FIGS. 4A and 4B.

Figure 4A:
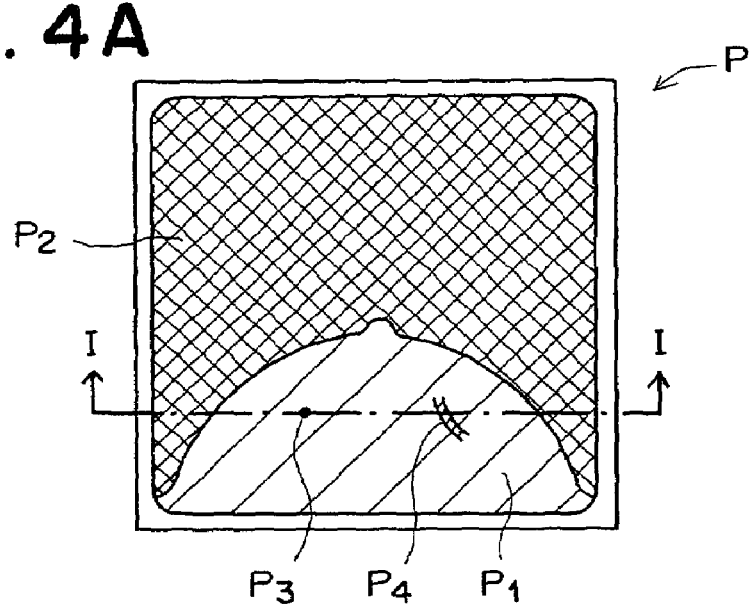
FIG. 4A is an explanatory view showing an X-ray image P containing an image $P_1$ of the mamma, which acts as an object.

FIG. 4A is an explanatory view showing an X-ray image P containing an image (mammogram) $P_1$ of the mamma, which acts as an object. FIG. 4B is a graph showing a distribution of image density values (a digital image signal) Dorg of the X-ray image P, the distribution being taken along line I—I of FIG. 4A. In the X-ray image P, the region other than the mamma image $P_1$ is a background region $P_2$, upon which the X-rays impinged directly without passing through the mamma acting as the object during an operation for recording the X-ray image P. The background region $P_2$ has the highest image density in the X-ray image P. Also, on the line I—I of FIG. 4A, a microcalcification pattern $P_3$, which represents malignant tumor, and a blood vessel pattern $P_4$, which extends in a predetermined direction, are located. Further, as illustrated in FIG. 4B, quantum noise $P_5$ of the X-rays is contained in the entire image.

Figure 4B:
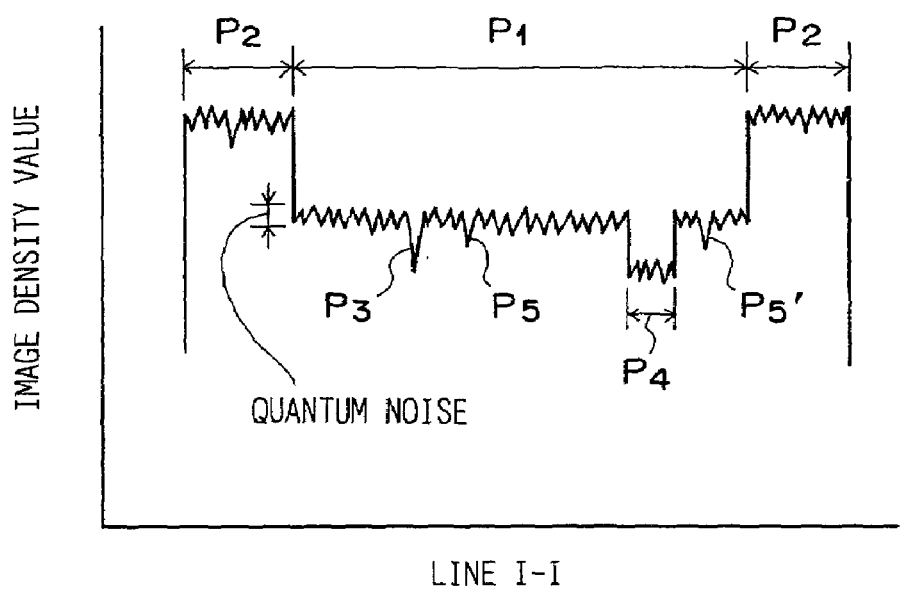
FIG. 4B is a graph showing a distribution of image density values Dorg of the X-ray image P, the distribution being taken along line I—I of FIG. 4A.

The image density values Dorg of the mammogram taken on the line I—I of FIG. 4A are distributed as illustrated in FIG. 4B. In the fine structure image forming means 42, the morphological filter processing is performed on the image signal by using the multi-structure element Bi, whose size is set to be smaller than the blood vessel pattern $P_4$ and larger than the microcalcification pattern $P_3$. The microcalcification pattern $P_3$ has the distribution of the image density values such that the image density values change over a range smaller than the size of the multi-structure element Bi. Therefore, the microcalcification pattern $P_3$ is smoothed by the closing processing. The blood vessel pattern $P_4$ (or a mammary gland pattern) has a distribution of the image density values such that the image density values fluctuate over a range larger than the size of the multi-structure element Bi. Therefore, the blood vessel pattern $P_4$ is not smoothed by the closing processing. As a result, the blood vessel pattern $P_4$ is removed, and only the microcalcification pattern $P_3$ is detected.

However, in cases where only the microcalcification pattern candidate detecting processing with the morphological filter processing in the fine structure image forming means 42 is performed, the problems occur in that, theoretically, a linear component and a structure not longer than the structure element length, which have a direction that does not coincide with any of the directions of the structure elements constituting the multi-structure element, (i.e., the linear structure area) cannot be removed. Also, a microcalcification pattern, which is unsharp or is constituted over a plurality of pixels, and a non-calcification pattern, which has a size identical with the size of the calcification pattern, (i.e., the coarse structure area) cannot always be removed with the morphological filter processing. Therefore, the image, which has been formed by the fine structure image forming means 42, represents a fine structure image containing the fine structure areas, such as the linear structure area and the coarse structure area, other than the microcalcification pattern $P_3$.

Accordingly, if image enhancement processing is performed on the fine structure image, the problems will occur in that, besides the microcalcification pattern $P_3$, the linear structure area and the coarse structure area, which could not been removed with the morphological filter processing, are also enhanced, and an image hard to see is obtained.

In order for the aforesaid problems to be eliminated, in the microcalcification pattern enhancement processing means 44, processing with a matched filter (a shape-dependent filter) described below is performed on the fine structure image, which has been formed by the fine structure image forming means 42, such that only the microcalcification pattern $P_3$ is enhanced specifically.

Figure 5A:
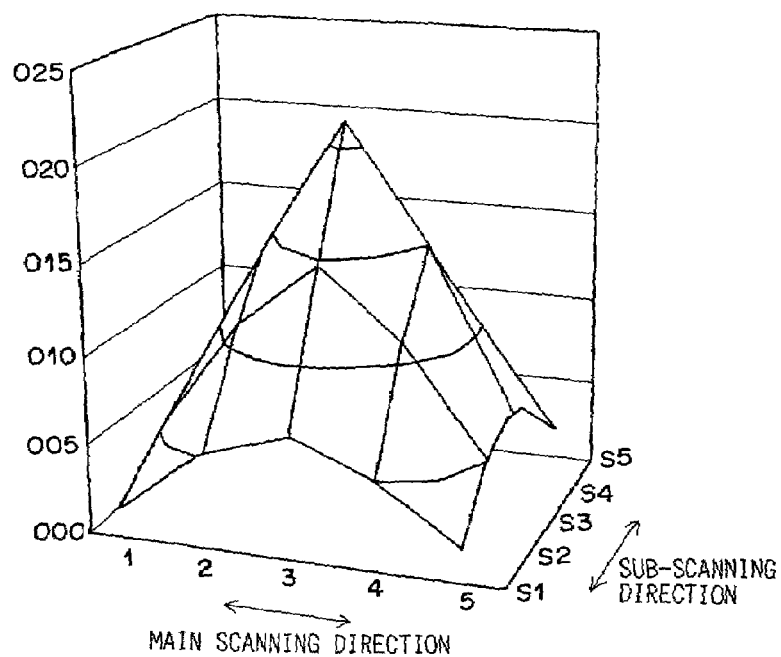
FIG. 5A is an explanatory view showing an example of a shape of a typical microcalcification pattern.
Figure 5B:
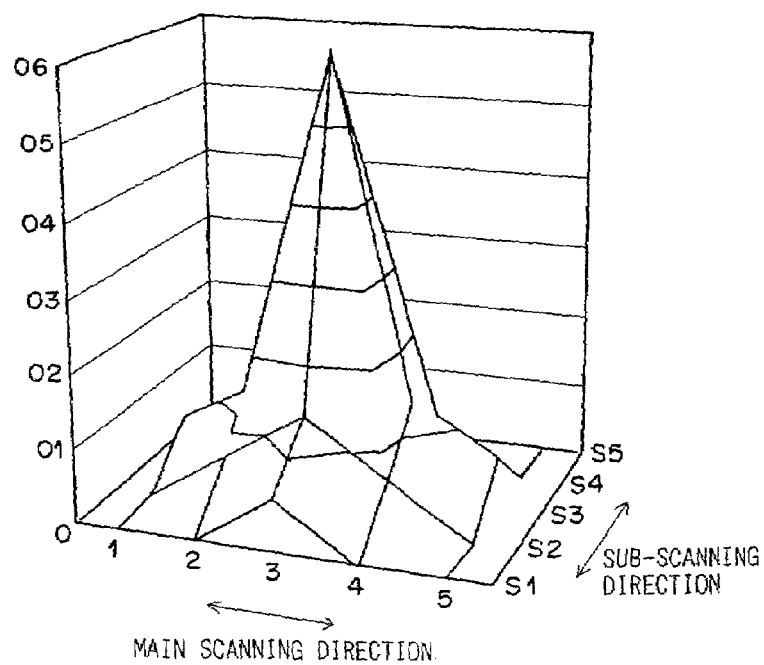
FIG. 5B is an explanatory view showing a different example of a shape of a typical microcalcification pattern.

FIG. 5A is an explanatory view showing an example of a shape of a typical microcalcification pattern. FIG. 5B is an explanatory view showing a different example of a shape of a typical microcalcification pattern. Each of FIGS. 5A and 5B shows the relationship between spatial coordinates of each pixel in a main scanning direction and a sub-scanning direction and an image density ratio at the spatial coordinates of the pixel, which image density ratio is calculated with the formula, maximum image density value/image density value of microcalcification pattern.

FIG. 5A shows the shape of a faint (unsharp) microcalcification pattern, which shape is such that the image density ratio at the center point of the microcalcification pattern is comparatively low (in the example of FIG. 5A, approximately 0.2), and the base region is broad (in the example of FIG. 5A, the base region extends over approximately 5×5 pixels). FIG. 5B shows the shape of a typical microcalcification pattern, which shape is such that the image density ratio at the center point of the microcalcification pattern is comparatively high (in the example of FIG. 5B, approximately 0.55), and the base region is narrow (in the example of FIG. 5B, the base region extends over approximately 2×2 pixels).

As the shape dependency of the matched filter, the shape shown in FIG. 5A or FIG. 5B may be applied directly. Specifically, filter parameters may be set such that the image density of the pattern area (i.e., the area of the microcalcification pattern candidate), which exhibits the image density distribution illustrated in FIG. 5A or FIG. 5B, is capable of being enhanced. More specifically, as for the shape of the microcalcification pattern illustrated in FIG. 5A, the two-dimensional filter having the characteristics shown in Table 1 below may be utilized. As for the shape of the microcalcification pattern illustrated in FIG. 5B, the two-dimensional filter having the characteristics shown in Table 2 below may be utilized.

TABLE 1

| 0.01 | 0.06 | 0.08 | 0.06 | 0.01 |
| 0.04 | 0.12 | 0.17 | 0.12 | 0.04 |
| 0.07 | 0.15 | 0.22 | 0.15 | 0.07 |
| 0.04 | 0.12 | 0.17 | 0.12 | 0.04 |
| 0.01 | 0.06 | 0.08 | 0.06 | 0.01 |

TABLE 2

| 0.00 | 0.00 | 0.07 | 0.00 | 0.00 |
| 0.00 | 0.07 | 0.13 | 0.07 | 0.00 |
| 0.07 | 0.13 | 0.60 | 0.13 | 0.07 |
| 0.00 | 0.07 | 0.13 | 0.07 | 0.00 |
| 0.00 | 0.00 | 0.07 | 0.00 | 0.00 |

From the two kinds of the matched filters having been prepared, the matched filter to be used for the processing may be selected as an external parameter and in accordance with the results of investigation of the image to be diagnosed.

It is considered that the shape of the microcalcification pattern embedded in the object image changes finely in accordance with an image recording apparatus, an image read-out apparatus, and setting conditions of the image recording apparatus and the image read-out apparatus. Therefore, the matched filter is optimized under the respective conditions. Alternatively, a plurality of matched filters, which have been optimized in accordance with various assumed conditions, are prepared previously and changed over in accordance with the object image to be subjected to the processing.

Besides the image recording conditions and the read-out conditions, the contrast and the size of the microcalcification pattern vary for different microcalcification patterns. Therefore, a plurality of matched filters, each of which enables the enhancement processing to be performed with respect to a specific type of microcalcification pattern, such as an unsharp microcalcification pattern, may be designed previously. Also, a matched filter, which is most appropriate for the contrast and the size of the microcalcification pattern embedded in the image to be processed, may be selected and utilized.

For example, as shown in Table 3 below, the characteristics of the matched filter should preferably be altered in accordance with the image recording conditions, such as a tube voltage (kV) of a radiation source, a radiation dose (mAs), compression force (N), and a compression thickness (cm). Also, with respect to the read-out conditions, as shown in Table 4 below, the characteristics of the matched filter should preferably be altered in accordance with an S value (read-out sensitivity), which is utilized in normalization processing. Alternatively, the characteristics of the matched filter may be altered in accordance with an L value (latitude). As for the details of the S value and the L value, reference should be made to, for example, Japanese Unexamined Patent Publication No. 2(1990)-108175. The term "direction A" as used in Table 3 and Table 4 means that the characteristics of the matched filter are altered toward the direction, which conforms to the faint microcalcification pattern illustrated in FIG. 5A. Also, the term "direction C" as used in Table 3 and Table 4 means that the characteristics of the matched filter are altered toward the direction, which reduces the effects of the matched filter, i.e. which corresponds to nonuse of the matched filter.

TABLE 3

| Tube voltage (kV) | High → Direction A | Low → Direction C |
|---|---|---|
| Radiation dose (mAs) | Large → Direction C | Small → Direction A |
| Compression force (N) | Large → Direction C | Small → Direction A |
| Compression thickness (cm) | Large → Direction A | Small → Direction C |

TABLE 4

| S value | Large → Direction A | Small → Direction C |
|---|---|---|

FIGS. 6A, 6B, and 6C are diagrams showing the effects of the abnormal pattern candidate detecting processing performed in the embodiment of the apparatus for detecting an abnormal pattern candidate in accordance with the present invention. FIG. 6A is a diagram showing a profile of a signal representing an original image. FIG. 6B is a diagram showing a profile of a signal representing a fine structure image, which has been obtained from morphological filter processing. FIG. 6C is a diagram showing a profile of a signal representing an enhancement-processed image, which has been obtained from matched filter processing. As illustrated in FIGS. 6A, 6B, and 6C, in cases where the enhancement-processed image is formed by use of the matched filter in the manner described above (FIG. 6C), the advantages over the cases where only the morphological filter processing is performed (FIG. 6B) are capable of being obtained in that only the microcalcification pattern candidate is capable of being enhanced specifically without being adversely affected by the coarse structure area and the linear structure area. Also, the microcalcification pattern candidate detecting processing, which is most appropriate for the image to be processed, is capable of being performed such that the overall throughput speed does not become low.

Thereafter, in the detection means 46, threshold value processing and detection of the microcalcification pattern candidate with estimation of the degree of malignancy are performed as in conventional techniques on the enhancement-processed image, which has been obtained from the microcalcification pattern enhancement processing means 44.

Specifically, a signal, which represents a non-calcification pattern and is contained in P of Formula (1), is removed by utilizing the differentiation information based upon the morphological operation performed with Formula (3) shown below.

$$M_{grad} = (1/2) \times \{f \lambda B - f \lambda B\} \quad (3)$$

A large value of Mgrad indicates a high possibility of being the microcalcification pattern $P_3$. Therefore, a calcification pattern candidate Cs is capable of being detected with Formula (4) shown below.

IF $P(i, j) \geq T1$ and $M_{grad}(i, j) \geq T2$

Then $C_s(i, j) = P$ else $C_s(i, j) = 0$ \quad (4)

A non-calcification pattern, which has a size different from the size of the calcification pattern, is capable of being removed by only the comparison of P of Formula (1) and a predetermined threshold value T1. Therefore, in cases where there is no risk that a non-calcification pattern having the same size as the size of the calcification pattern remains, it is sufficient for the condition of the first term of Formula (4), i.e. the condition of $P(i, j) \geq T1$, to be satisfied.

Finally, a cluster Cc of the calcification pattern is detected by the combination of the opening operation and the closing operation of the multi-scale in accordance with Formula (5) shown below. In this manner, the pixels (spatial coordinates of the pixels) represented by the image signal (hereinbelow referred to as the microcalcification pattern image signal $S_1$), which represents the microcalcification pattern candidate $Q_1$, are capable of being specified.

$$C_c = C_s \lambda_1 B \lambda_3 B \lambda_2 B \quad (5)$$

In Formula (5), $\lambda_1$ and $\lambda_2$ are respectively determined by the maximum distance of the calcification pattern to be combined and the maximum radius of the isolated pattern to be removed, and $\lambda_3 = \lambda_1 + \lambda_2$.

In Formula (4), T1 and T2 represent the threshold values, which have been determined experimentally for discriminating the microcalcification pattern $P_3$ and the non-calcification pattern (such as the noise component $P_5'$) from each other. However, instead of the threshold values T1 and T2 always taking the fixed values, the threshold values T1 and T2 should preferably be set at appropriate values in accordance with the amount of change in image signal values, the predetermined read-out sensitivity (the S value) or the latitude (the L value) having been determined with EDR processing, or the like, as described in, for example, Japanese Unexamined Patent Publication No. 9(1997)-106448. In such cases, before the final comparison is made, a plurality of different levels of threshold values may be prepared and applied by way of trial, and the threshold values may be employed ultimately, which threshold values are of the levels such that the number of the detected microcalcification pattern candidates falls within the range of, for example, seven to ten.

In cases where the threshold value processing described above is performed, as described above, as for the high image density-high signal level type of image signal (in which a pixel of a high image density has a large digital signal value), the relationship between the opening operation and the closing operation is reversed.

Thereafter, the judgment means 50 judges that the microcalcification pattern image signal $S_1$ representing the microcalcification pattern candidate $Q_1$ has been detected. Also, the judgment means 50 feeds a coordinate signal (hereinbelow referred to as the calcification pixel coordinate signal) $D_1$, which specifies the spatial coordinates of the pixels represented by the microcalcification pattern image signal $S_1$, and a fluctuation Dmor of the image density values of the extracted microcalcification pattern candidate $Q_1$ into the local area limited region extracting means 60. In cases where it has been judged that the microcalcification pattern image signal $S_1$ representing the microcalcification pattern candidate $Q_1$ has not been detected, the judgment means 50 finishes the processing instead of feeding out the calcification pixel coordinate signal $D_1$, which specifies the spatial coordinates of the pixels represented by the microcalcification pattern image signal $S_1$.

In cases where it has been judged that the microcalcification pattern image signal $S_1$ has been detected, the entire area image signal S having been stored in the entire area image memory 10 is also fed into the local area limited region extracting means 60. In accordance with the received entire area image signal S and the received calcification pixel coordinate signal $D_1$, the local area limited region extracting means 60 specifies the pixels (i.e., the local area limited region constituted of the set of the pixels), which include the pixels corresponding to the microcalcification pattern image signal $S_1$ and the neighboring pixels, according to a predetermined processing procedure. The local area limited region extracting means 60 thus extracts the local area limited image signal $S_2$, which represents the local area limited image $Q_2$, from the entire area image signal S.

The extracted local area limited image signal $S_2$, which represents the local area limited image $Q_2$, is fed into the local area limited image enhancing means 70. In the local area limited image enhancing means 70, the image enhancement processing, such as enhancement processing in the frequency domain, gradation processing, or image size enlargement processing appropriate for the use of the microcalcification pattern candidate $Q_1$ is performed on the local area limited image signal $S_2$.

The processed local area limited image signal $S_2$, which is has been obtained from the image enhancement processing performed by the local area limited image enhancing means 70, is fed into the local area limited image displaying means 90. As illustrated in FIG. 2B, the local area limited image $Q_2$ containing the microcalcification pattern candidate $Q_1$ is displayed on the display surface of the local area limited image displaying means 90 and in accordance with the processed local area limited image signal $S_2$.

In cases where the local area limited image $Q_2$ containing the microcalcification pattern candidate $Q_1$ is displayed on the local area limited image displaying means 90, feature measures, such as a calcification density, of the microcalcification pattern candidate $Q_1$, which concern the detection of the microcalcification pattern candidate $Q_1$, may be displayed as quantitative information on the local area limited image displaying means 90 together with the local area limited image $Q_2$ containing the microcalcification pattern candidate $Q_1$.

In this manner, of the entire area image Q, only the local area limited image $Q_2$ containing the microcalcification pattern candidate $Q_1$ is independently displayed on the local area limited image displaying means 90. Therefore, the person, who views the radiation image, is capable of concentrating attention on the local area limited image $Q_2$, which is displayed on the local area limited image displaying means 90. As a result, the Befficiency and the accuracy of the diagnosis is capable of being kept high.

As disclosed in, for example, Japanese Unexamined Patent Publication No. 8 (1996)-294479, in lieu of the entire area image displaying means 30 and the local area limited image displaying means 90 being provided as two independent means, a single displaying means, which acts as both the entire area image displaying means 30 and the local area limited image displaying means 90, may be utilized. In such cases, of the entire area image Q displayed, only the microcalcification pattern candidate $Q_1$ is enhanced selectively. Therefore, overshooting and undershooting are capable of being suppressed, and an artifact due to the overshooting and undershooting is capable of being reduced. Accordingly, a reproduced image is capable of being obtained, which has good image quality and can serve as an effective tool in the efficient and accurate diagnosis of an illness.

With the embodiment described above, the enhancement-processed image is formed by performing the processing with the matched filter, which has been designed in accordance with the shape of the microcalcification pattern, on the fine structure image, which has been obtained from the morphological filter processing performed as in the conventional techniques. Therefore, the advantages over the cases where only the morphological filter processing is performed are capable of being obtained in that only the microcalcification pattern candidate is capable of being enhanced specifically without being adversely affected by the coarse structure area and the linear structure area. Also, the fine structure areas (the noise components), such as the coarse structure area and the linear structure area, which could not be removed with the morphological filter processing, are capable of being suppressed relatively, and the performance (the detection accuracy) of the microcalcification pattern candidate detecting processing is capable of being enhanced. Accordingly, through the enhancement of the performance of the abnormal pattern candidate detection with the computer aided medical image diagnosing system, i.e. the increase in a true positive detection rate (TPR) and the decrease in the number of false positives (FP's) per image, the diagnostic capability of the medical doctors is capable of being enhanced.

What is claimed is:

1. A method of detecting an abnormal pattern candidate, in which a microcalcification pattern candidate embedded in an object image is detected as an abnormal pattern candidate and in accordance with image information representing the object image, the method comprising the steps of:
   i) performing processing, in which a first shape-dependent filter that is dependent on the shape of a microcalcification pattern is utilized, on the object image, a fine structure image, which illustrates a fine structure area embedded in the object image, being thereby formed,
   ii) performing enhancement processing, in which a second shape-dependent filter that is dependent on the shape of a microcalcification pattern is utilized, on the fine structure image, an enhancement-processed image, in which the microcalcification pattern has been enhanced, being thereby formed, and
   iii) detecting the microcalcification pattern candidate by use of the enhancement-processed image.

2. A method as defined in claim 1 wherein a plurality of second shape-dependent filters, which conform to different image recording conditions at the time of object image acquisition, are prepared for the respective image recording conditions,
   a second shape-dependent filter, which conforms to the image recording conditions of the object image to be processed, is selected from the plurality of the second shape-dependent filters having been prepared, and
   the enhancement processing is performed by use of the thus selected second shape-dependent filter.

3. A method as defined in claim 1 wherein a plurality of second shape-dependent filters, which conform to different read-out conditions at the time of object image acquisition, are prepared for the respective read-out conditions,
   a second shape-dependent filter, which conforms to the read-out conditions of the object image to be processed, is selected from the plurality of the second shape-dependent filters having been prepared, and
   the enhancement processing is performed by use of the thus selected second shape-dependent filter.

4. A method as defined in claim 1 wherein a plurality of second shape-dependent filters, which conform to different contrasts of microcalcification patterns embedded in object images, are prepared for the respective contrasts,
- a second shape-dependent filter, which conforms to the contrast of the microcalcification pattern embedded in the object image to be processed, is selected from the plurality of the second shape-dependent filters having been prepared, and
- the enhancement processing is performed by use of the thus selected second shape-dependent filter.

5. A method as defined in claim 1 wherein a plurality of second shape-dependent filters, which conform to different sizes of microcalcification patterns embedded in object images, are prepared for the respective sizes,
- a second shape-dependent filter, which conforms to the size of the microcalcification pattern embedded in the object image to be processed, is selected from the plurality of the second shape-dependent filters having been prepared, and
- the enhancement processing is performed by use of the thus selected second shape-dependent filter.

6. A method as defined in claim 1 wherein a plurality of second shape-dependent filters, which conform to different combinations of image recording conditions at the time of object image acquisition, read-out conditions at the time of object image acquisition, contrasts of microcalcification patterns embedded in object images, and sizes of microcalcification patterns embedded in object images, are prepared for the respective combinations,
- a second shape-dependent filter, which conforms to the combination with respect to the object image to be processed, is selected from the plurality of the second shape-dependent filters having been prepared, and
- the enhancement processing is performed by use of the thus selected second shape-dependent filter.

7. A method as defined in claim 1, 2, 3, 4, 5, or 6 wherein the first shape-dependent filter is a morphological filter.

8. An apparatus for detecting an abnormal pattern candidate, in which a microcalcification pattern candidate embedded in an object image is detected as an abnormal pattern candidate and in accordance with image information representing the object image, the apparatus comprising:
- i) fine structure image forming unit that performs processing, in which a first shape-dependent filter that is dependent on the shape of a microcalcification pattern is utilized, on the object image, in order to form a fine structure image, which illustrates a fine structure area embedded in the object image,
- ii) enhancement-processed image forming unit that performs enhancement processing, in which a second shape-dependent filter that is dependent on the shape of a microcalcification pattern is utilized, on the fine structure image having been formed, in order to form an enhancement-processed image, in which the microcalcification pattern has been enhanced, and
- iii) detection unit that detects the microcalcification pattern candidate by use of the enhancement-processed image having been formed.

9. An apparatus as defined in claim 8 wherein the enhancement-processed image forming unit operates such that:
- a plurality of second shape-dependent filters, which conform to different image recording conditions at the time of object image acquisition, are prepared for the respective image recording conditions,
- a second shape-dependent filter, which conforms to the image recording conditions of the object image to be processed, is selected from the plurality of the second shape-dependent filters having been prepared, and
- the enhancement processing is performed by use of the thus selected second shape-dependent filter.

10. An apparatus as defined in claim 8 wherein the enhancement-processed image forming unit operates such that:
- a plurality of second shape-dependent filters, which conform to different read-out conditions at the time of object image acquisition, are prepared for the respective read-out conditions,
- a second shape-dependent filter, which conforms to the read-out conditions of the object image to be processed, is selected from the plurality of the second shape-dependent filters having been prepared, and
- the enhancement processing is performed by use of the thus selected second shape-dependent filter.

11. An apparatus as defined in claim 8 wherein the enhancement-processed image forming unit operates such that:
- a plurality of second shape-dependent filters, which conform to different contrasts of microcalcification patterns embedded in object images, are prepared for the respective contrasts,
- a second shape-dependent filter, which conforms to the contrast of the microcalcification pattern embedded in the object image to be processed, is selected from the plurality of the second shape-dependent filters having been prepared, and
- the enhancement processing is performed by use of the thus selected second shape-dependent filter.

12. An apparatus as defined in claim 8 wherein the enhancement-processed image forming unit operates such that:
- a plurality of second shape-dependent filters, which conform to different sizes of microcalcification patterns embedded in object images, are prepared for the respective sizes,
- a second shape-dependent filter, which conforms to the size of the microcalcification pattern embedded in the object image to be processed, is selected from the plurality of the second shape-dependent filters having been prepared, and
- the enhancement processing is performed by use of the thus selected second shape-dependent filter.

13. An apparatus as defined in claim 8 wherein the enhancement-processed image forming unit operates such that:
- a plurality of second shape-dependent filters, which conform to different combinations of image recording conditions at the time of object image acquisition, read-out conditions at the time of object image acquisition, contrasts of microcalcification patterns embedded in object images, and sizes of microcalcification patterns embedded in object images, are prepared for the respective combinations,
- a second shape-dependent filter, which conforms to the combination with respect to the object image to be processed, is selected from the plurality of the second shape-dependent filters having been prepared, and
- the enhancement processing is performed by use of the thus selected second shape-dependent filter.

14. An apparatus as defined in claim 8, 9, 10, 11, 12, or 13 wherein the fine structure image forming unit utilizes a morphological filter as the first shape-dependent filter.

15. The method of claim 2, wherein the image recording condition is one of a tube voltage of a radiation source, a radiation dose, a compression force and a compression thickness.

16. The apparatus of claim 9, wherein the image recording condition is one of a tube voltage of a radiation source, a radiation dose, a compression force and a compression thickness.

17. The method of claim 1, wherein the first shape-dependent filter is a morphological filter and the second shape-dependent filter represents an image density pattern of the microcalcification pattern.

18. The apparatus of claim 8, wherein the first shape-dependent filter is a morphological filter and the second shape-dependent filter represents an image density gradient of the microcalcification pattern.

19. The method of claim 1, wherein the second shape-dependent filter is optimized with respect to an image recording apparatus and an image read-out apparatus.

20. The apparatus of claim 8, wherein the second shape-dependent filter is optimized with respect to an image recording apparatus and an image read-out apparatus.

21. The method of claim 1, wherein the fine structure image comprises only structures approximately the size of microcalcifications and smaller.

22. The apparatus of claim 8, wherein the fine structure image comprises only structures approximately the size of microcalcifications and smaller.

23. The method of claim 1, wherein an image formed from processing using the first shape-dependent filter is subtracted from the object image to form the fine structure image.

24. The apparatus of claim 8, wherein an image formed from processing using the first shape-dependent filter is subtracted from the object image to form the fine structure image.

* * * * *